(12) United States Patent
Butler et al.

(10) Patent No.: US 9,563,615 B2
(45) Date of Patent: Feb. 7, 2017

(54) DYNAMIC MODELING OF GEOSPATIAL WORDS IN SOCIAL MEDIA

(71) Applicant: International Business Machines Corporation, Armonk, NY (US)

(72) Inventors: Christopher J. Butler, Hawthorn East (AU); Bo Han, Carlton (AU); Jennifer C. Lai, Brighton (AU)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 14/748,754

(22) Filed: Jun. 24, 2015

(65) Prior Publication Data

US 2016/0335235 A1 Nov. 17, 2016

Related U.S. Application Data

(63) Continuation of application No. 14/710,915, filed on May 13, 2015, now Pat. No. 9,405,743.

(51) Int. Cl.
*G06F 17/24* (2006.01)
*G06F 17/27* (2006.01)

(52) U.S. Cl.
CPC .......... *G06F 17/241* (2013.01); *G06F 17/271* (2013.01); *G06F 17/278* (2013.01)

(58) Field of Classification Search
None
See application file for complete search history.

(56) References Cited

U.S. PATENT DOCUMENTS

| 8,676,807 | B2 | 3/2014 | Xiao et al. |
| 9,262,438 | B2* | 2/2016 | Agrawal ........... G06F 17/30241 |
| 9,390,104 | B2* | 7/2016 | Thomee ........... G06F 17/30241 |
| 9,405,743 | B1* | 8/2016 | Butler ............... G06F 17/2765 |
| 2008/0294678 | A1* | 11/2008 | Gorman ........... G06F 17/30241 |
| 2010/0161591 | A1 | 6/2010 | Jones et al. |
| 2010/0205176 | A1 | 8/2010 | Ji et al. |
| 2012/0059812 | A1 | 3/2012 | Bliss et al. |
| 2012/0136865 | A1 | 5/2012 | Blom et al. |
| 2012/0221687 | A1 | 8/2012 | Hunter et al. |
| 2013/0185361 | A1 | 7/2013 | Balasubramanian et al. |

(Continued)

OTHER PUBLICATIONS

U.S. Appl. No. 14/748,754, filed Jun. 24, 2015.

(Continued)

*Primary Examiner* — Marcus T Riley
(74) *Attorney, Agent, or Firm* — Scully, Scott, Murphy & Presser, P.C.; Louis J. Percello, Esq.

(57) ABSTRACT

Dynamically modelling geospatial words in social media, in one aspect, generates a word set based on frequencies of words occurring in GPS annotated text data generated by a GPS-enabled device containing latitude and longitude coordinates. Locations are partitioned by mapping GPS coordinates in the GPS annotated text data to a set of discrete non-overlapped locations. A text stream contained in the GPS annotated text data is segmented into time windows. Footprints of locations in time windows are generated. Geospatial weights associated with words in the word set are generated based on localness of words determined based on the footprints. Words in a text message are extracted and scores are determined for the set of discrete non-overlapped locations associated with the words.

6 Claims, 4 Drawing Sheets

(56) References Cited

U.S. PATENT DOCUMENTS

| | | |
|---|---|---|
| 2014/0006408 A1 | 1/2014 | Rae et al. |
| 2014/0074871 A1 | 3/2014 | Ngo et al. |
| 2014/0222799 A1 | 8/2014 | Lei et al. |
| 2014/0280103 A1 | 9/2014 | Harris et al. |
| 2015/0113018 A1 | 4/2015 | Steed et al. |

OTHER PUBLICATIONS

U.S. Appl. No. 15/202,734, filed Jul. 6, 2016.
U.S. Appl. No. 14/710,915, filed May 13, 2015.
Notice of Allowance dated Apr. 27, 2016 received in parent U.S. Appl. No. 14/710,915, 9 pages.
List of IBM Patents or Patent Applications Treated as Related, dated Jul. 6, 2016, 2 pages.
Han, B. et al., "Text-based twitter user geolocation prediction" Journal of Artificial Intelligence Research (Jan. 2014) pp. 451-500, vol. 49.
Cheng, Z. et al., "You are where you tweet: a content-based approach to geo-locating Twitter users" CIKM '10 Proceedings of the 19th ACM international conference on Information and knowledge management (Oct. 2010) pp. 759-768.
Gravano, L. et al., "Categorizing web queries according to geographical locality" CIKM '03 Proceedings of the twelfth international conference on Information and knowledge management (Nov. 2003) pp. 325-333.
Han, B. et al., "Geolocation prediction in social media data by finding location indicative words" (COLING 2012) Proceedings of the 24th International Conference on Computational Linguistics (Dec. 2012) pp. 1045-1062.
Sakaki, T. et al., "Earthquake shakes Twitter users: real-time event detection by social sensors" WWW '10 Proceedings of the 19th international conference on World wide web (Apr. 2010) pp. 851-860.
Schulz, A. et al., "A multi-indicator approach for geolocalization of tweets" (ICWSM 2013) Proceedings of the 7th International Conference on Weblogs and Social Media (Jun. 2013) pp. 573-582.
Vitter, J.S., "Random sampling with a reservoir" ACM Transactions on Mathematical Software (TOMS), (Mar. 1985) pp. 37-57, vol. 11, No. 1.
Wing, B.P. et al., "Simple supervised document geolocation with geodesic grids" HLT '11 Proceedings of the 49th Annual Meeting of the Association for Computational Linguistics: Human Language Technologies (Jun. 2011) pp. 955-964.
List of IBM Patents or Patent Applications Treated as Related, dated Jun. 24, 2015, 2 pages.
U.S. Office Action dated Jan. 20, 2016 issued in U.S. Appl. No. 14/710,915, pp. 1-11.

\* cited by examiner

DYNAMIC MODELING OF GEOSPATIAL WORDS IN SOCIAL MEDIA

FIELD

The present application relates generally to computers and computer applications, and more particularly to dynamic modelling of geospatial words in social media.

BACKGROUND

Geospatial information is useful to a number of applications, such as targeted advertising, regional sentiment analysis and situational awareness. Due to a lack of sufficient and reliable geographical information in social media (e.g., Internet Protocol (IP) addresses mapped to locations), various geotagging methods have been utilized to infer geographical location based on text data. Such geotagging methods leverage location indicative words to determine location. For instance, by knowing local sports event footy and a local transportation tram, the most probable location inferred is City X, Country Y, because these words together are mostly used by City X residents.

Streaming text data in social media is dynamic, i.e., its content and topics change rapidly, making geotagging a non-trivial task. Existing geotagging models are often trained in an off-line manner, and this implies these models do not capture the temporal variance of geospatial words, when time-invariant geospatial words are persistently associated with a location, while other words are only temporarily associated with a location.

BRIEF SUMMARY

A dynamic geospatial word modelling that keeps geotagging models up-to-date is presented. A method of dynamically modeling geospatial words, for example, in social media data, in one aspect, may comprise receiving GPS annotated text data generated by a GPS-enabled device containing latitude and longitude coordinates. The method may also include generating a word set based on frequencies of words occurring in the GPS annotated text data. The method may further include partitioning locations by mapping GPS coordinates in the GPS annotated text data to a set of discrete non-overlapped locations. The method may also include segmenting a text stream contained in the GPS annotated text data into time windows. The method may further include generating footprints of locations in time windows. The method may further include determining geospatial weights associated with words in the word set based on localness of words determined based on the footprints. The method may also include dynamically integrating in geotagging by extracting words in a text message and determining scores associated with the set of discrete non-overlapped locations.

A system for dynamically modeling geospatial words, for example in social media, in one aspect, may comprise a data collector operable to execute on a processor and further operable to receive GPS annotated text data generated by a GPS-enabled device containing latitude and longitude coordinates. A model trainer may be operable to execute on the processor and further operable to generate a word set based on frequencies of words occurring in the GPS annotated text data. The model trainer may be further operable to partition locations by mapping GPS coordinates in the GPS annotated text data to a set of discrete non-overlapped locations. The model trainer may be further operable to segment a text stream contained in the GPS annotated text data into time windows. The model trainer may be further operable to generate footprints of locations in time windows. The model trainer may be further operable to determine geospatial weights associated with words in the word set based on localness of words determined based on the footprints. The model trainer may be further operable to dynamically integrate geotagging by extracting words in a text message and determining scores associated with the set of discrete non-overlapped locations. A storage device coupled to the processor may be operable to store the footprints and GPS labeled data, the GPS labeled data generated based on mapping the words in the word set to a respective location in the set of discrete non-overlapped locations.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A method and system are presented that leverage location indicative words to determine location. The method and system for example may offset the temporal variance in geospatial word modelling by dynamically weighting word localness scores in social media text stream. A dynamic geospatial word modelling technique in one embodiment keeps geotagging models up-to-date. In one aspect, the techniques keep the models up-to-date with only fixed computational cost. In one embodiment, randomized methods may be applied to generate consecutive location footprints for each word over time. Word localness scores are calculated based on these footprints. In one embodiment, the overall word localness can be incrementally updated with only fixed computational cost. A discriminative model in one embodiment then seamlessly incorporates updated localness scores in geotagging. As a result, the geotagging model is kept up-to-date without re-training the model on all historical data. Such an approach, for example, is useful in stream computing environment in which endless data is transmitted and received.

Hence, instead of having to retrain a model over all historical data, the randomized methods in one embodiment of the present disclosure keep geotagging model up-to-date with only fixed computational cost. In another aspect, a system that implements the methods may be adaptive to the computational capability, e.g., by tuning parameters in the system, geotagging models can be built with limited resource.

Figure 1:
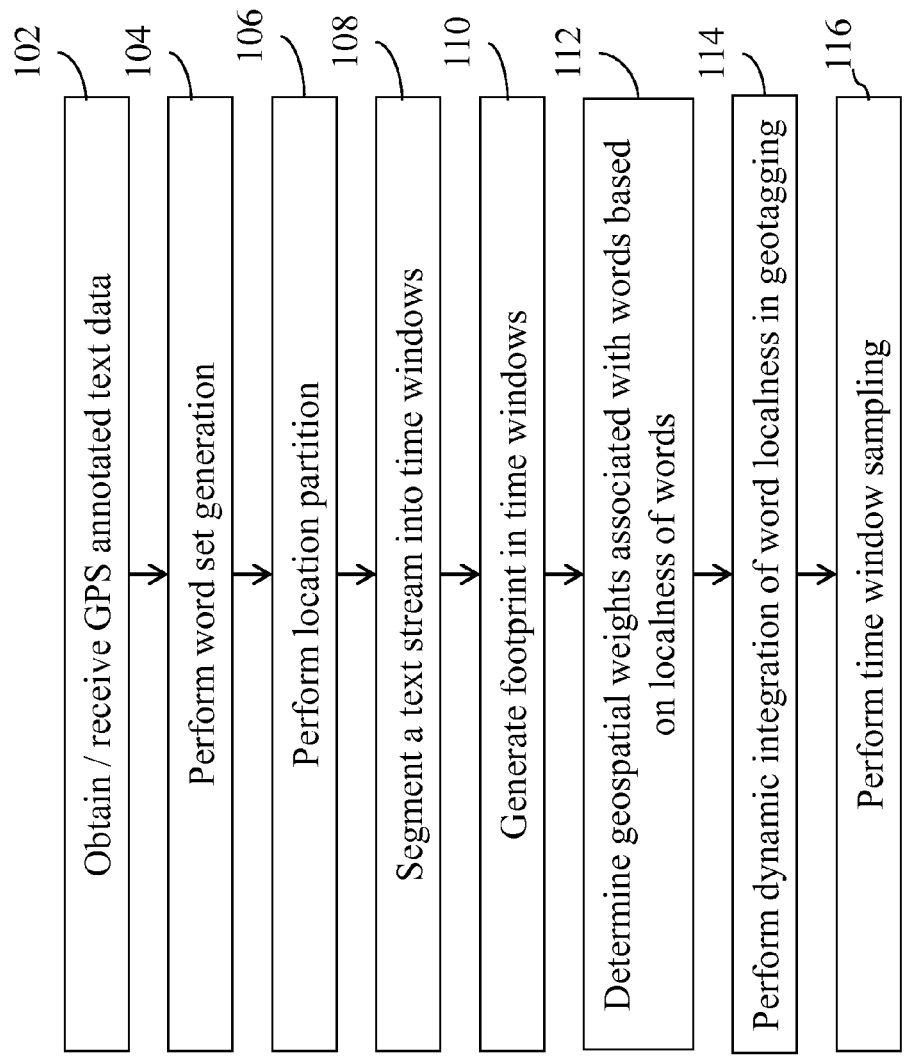
FIG. 1 is a flow diagram illustrating a method of dynamic modelling of geo spatial words in social media in one embodiment of the present disclosure.

FIG. 1 is a flow diagram illustrating a method of dynamic modelling of geo spatial words in social media in one embodiment of the present disclosure.

To associate words with locations a set of ground truth data, for example, global positioning system (GPS) annotated text, may be used. Such data can be obtained or collected via a number of ways, for instance, social media messages sent from GPS-enabled mobile devices that contain latitude and longitude coordinates. At 102, GPS annotated text data is obtained or received. For example, social media message generated by a GPS-enabled device containing latitude and longitude coordinates may be obtained. In one aspect, GPS annotated text data may include a pre-existing collection of GPS-labeled text corpora. This data may be used at 104 to generate all words (i.e., the word set) whose localness the system and method of the present disclosure in one embodiment tracks over time, forming an initial geotagging model. In one embodiment, the GPS labels of the GPS annotated text data are also used in location partition at 106.

At 104, word set generation is performed, for example, based on the obtained GPS annotated text data. The word set generation process in one embodiment generates a word type set $\{w_i | i \in 1, \ldots, n\}$ from a collection of social media data, the obtained GPS annotated data. "n" represents the number of words in a set. Words are tokenized and counted and then a user-defined threshold (e.g., 100) is applied to preserve sufficiently frequent words. For example, words occurring in the collection of data in frequency that meets a frequency threshold are included in the word set.

At 106, location partition is performed. All GPS coordinates in the GPS annotated text data are mapped to a set of discrete non-overlapped locations, e.g., metropolitan city centers $\{c_j | j \in 1, \ldots, m\}$. "m" represents the number of discrete non-overlapped locations in a set of discrete non-overlapped locations.

At 108, a live text stream is segmented into time windows. A live text stream refers to new GPS text data that are continuously harvested from social media feed, for example, now and in the future. In one embodiment, the live stream data is used to evaluate the word localness over time. In one embodiment, a constant text stream is partitioned into increasing consecutive time windows $\{T_p | p \in 1, \ldots, t\}$. "t" represents the number of time periods or time windows. A time window contains data generated in a time period, e.g., hourly, daily or weekly. In one embodiment, a time window length is user specified or configurable, depending on the computational resources and incoming data rates.

Figure 2:
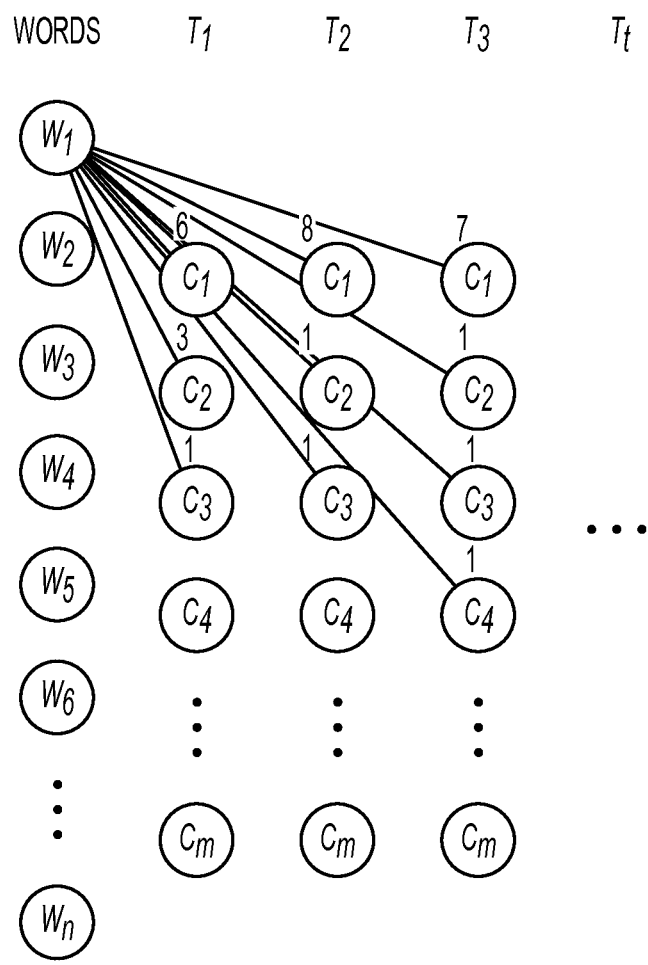
FIG. 2 shows a bipartite graph constructed between word types in messages and mapped locations in a plurality of time windows.

At 110, footprint is generated in time windows. For each GPS-labeled message in a time window (e.g., Tp), a bipartite graph is constructed between a word type (e.g., wi) in the message and the mapped location (e.g., cj). An example of a GPS-labeled message may include a social media message that includes location or GPS information, e.g., a microblog with GPS information such as the geospatial coordinates of where the microblog was generated, a social network content posting with embedded with GPS data, or another message with embedded data structure with location or GPS information. GPS coordinates, for example, can be mapped to a point on earth. GPS information or coordinates may be mapped to non-overlapped discrete locations. A message with GPS information accordingly may be transformed into a message associated with a non-overlapped discrete location. In one embodiment, the nearest location in the pre-partitioned location set to this point can be determined to be the mapped location. For instance, the mapped location for (−37.813,144.963) is Melbourne, Australia. The association strength is the location distribution of wi, i.e., co-occurrences of wi and a location normalized by all occurrences of wi in Tp. For example, consider that w1 occurs n_j times in cj, respectively, during Tp. The association strength between w1 and c1 may be determined as n_1/(n_1+n_2+ . . . +n_m). The denominator is the normalization factor which is the sum of all occurrences of w1 during Tp. The methodology then selects k (<m) locations relative to the association strength for wi in Tp, as shown in FIG. 2. k represents draws from locations where wi occurs in Tp. Some locations may be selected multiple times due to the different association strength. For instance, if 10 draws were obtained from 100 occurrences of word w1 in two locations c1, c2, and if the strength numbers are 0.9 and 0.1 respectively, then the expected selections of 10 draws would be 9 c1 and 1 c2. These k locations are the generated footprint, and the footprint is parameterized by word type wi, time window Tp, and the user-specified number of random selections k.

FIG. 2 shows a bipartite graph constructed between word types in messages and mapped locations in a plurality of time windows. FIG. 2 shows a reconstructed graph based on a series of bipartite graphs over time. The columns Words—T1, Words—T2 and Words—T3 may be viewed as bipartite graphs between words and locations in consecutive time periods, T1, T2, T3, . . . Tt. Each bipartite graph shows the locations associated with a word type. For instance, the bipartite graph example of Words—T1 shows that w1 is associated with locations, c1, c2, and c3, when k=10. For instance, the numbers shown in edges between w1 and locations c1, c2 and c3 in T1 suggest that c1, c2 and c3 are selected 6, 3, 1 times, respectively. Similarly, for w1 in time window T2, c1, c2 and c3 are selected 8, 1, 1 times, respectively. Likewise, for w1 in time window T3, c1, c2, c3 and c4 are selected 7, 1, 1, 1 times, respectively. The processing at 110 may sample the number of locations a word is associated with, e.g., to reduce the size and therefore computational cost of the model.

At 112, word localness calculation is performed for a footprint, for example, generated at 110. For each word wi, a methodology of the present disclosure in one embodiment calculates localness score in each time window Tp. The localness score can be implemented in various ways, provided the location indicativeness can be differentiated. For instance, the reciprocal of the footprint entropy (with additive smoothing) can be applied to calculate the localness score of wi. In one embodiment, a localness score of wi may be computed as follows:

$$\text{localness}(i, p, k) = \frac{1}{1 - \sum_{1}^{m} \text{prob}_j \log \text{prob}_j}$$

As the above formula shows, for a word wi, pj is the re-normalized association strength between wi and cj in the previous k selections. For instance, in Words—T1 bipartite graph shown in FIG. 2, localness score for w1 is 1/(1+(−6/10 log 6/10)+(−3/10 log 3/10)+(−1/10 log 1/10)). Entropy herein refers to information entropy, which is defined on a discrete probability distribution, Entropy(P)=$-\Sigma_1^m$ prob$_j$ log prob$_j$, in which prob is a probability for a possible event j in distribution P. A high localness score indicates a skewed distribution of footprint (i.e., a low entropy), and therefore wi is a local word. A high localness score means a low entropy as defined in previous localness formula and the information entropy definition, and a low entropy indicates a skewed distribution as a property of information entropy. This entropy description is an analog of word frequency in different locations. A low localness score suggests wi occur in many locations (i.e., a high entropy), and it is unlikely to be location indicative. The localness score is set to zero when a word has fewer than k locations in a time window. In one embodiment, time windows are constantly obtained over time, i.e., Tp in p|p∈1, . . . , t is increasing. The localness scores of each time window are then added up as the word geospatial weight in one embodiment as follows:

$$\text{weight}[w_i] = \Sigma_{p=1}^{t} \text{localness}(i,p,k)$$

The notations for i and k refer to a word type (e.g., $w_i$ for i from 1 to n) and k location selections described above. Localness(i, p, k) represents the localness score of word wi during time period Tp when selecting k locations in the calculation.

A time-invariant location indicative word would have consecutive high localness scores leading to a high geospatial weight. In contrast, the localness scores fluctuate for temporal local words, i.e., some time windows have high localness scores, while others have low localness scores. The temporal variance of word location indicativeness is therefore captured in the accumulated geospatial weight. The accumulated geospatial weight incurs a fixed computational cost, because only localness score of new time windows are required to be calculated and added-up.

At 114, dynamic integration of word localness in geotagging is performed. For example, geotagging may be performed for text messages, which may not include GPS coordinates. When geotagging a text message, words are extracted and are used as evidence to score locations. For example, a new message or text message (that does not include location indication) may be received and geographical location associated this new message may be determined or predicted. In one embodiment, the geotagging prediction is based on the following formula:

$$\text{argmax} c_j = \exp\left(\sum_{i=1}^{n} P(c_j | w_i) \text{weight}[w_i]\right)$$

The above formula finds a location among all potential locations with the highest value as computed in the right hand side of the equation. P(cj|wi), the probability of cj given wi, can be obtained by the accumulated location distribution over time for word wi. For instance, referring to FIG. 2, suppose current period is T3. Using w1 as example, w1 occurs (6+8+7) times in c1, (3+1+1) times in c2, (1+1+1) times in c3 and 1 in c4. As a result, p(c1|w1) would be (6+8+7)/((6+8+7)+(3+1+1)+(1+1+1)+1). In one embodiment, only cj with non-zero P(cj|wi) are eligible to be selected as potential predictions. weight[wi] is the geospatial weight for wi. Its dynamic values ensure up-to-date geotagging predictions. The cj with the highest right hand value is determined to be the predicted location in one embodiment. Geotagging takes a text message as the input and outputs a predicted location using words in the text message. In one embodiment, these components (weight[wi] and p(ci|wi)), which are updated periodically, are additive and are only updated when a new time window is obtained.

At 116, time window sampling is performed. Sampling may employ a random selection process. The sampling of time windows in one embodiment samples a fixed number of time windows, e.g., to maintain a constant computational cost for the model as the GPS labeled dataset increases with time.

The number of time windows t increases over time. To adapt the system computational capability to different hardware, time window sampling is also introduced in one embodiment. For instance, instead of using information from all time windows, only sampled time windows are used. The sampling strategy can be implemented in various ways depending on application scenarios. For instance, reservoir sampling ensures a methodology of the present disclosure get a fixed size unbiased sample of time windows. In contrast, a fixed first-in-first-out queue captures the most recent time windows to cope with rapidly changing text stream data. Any one or more of the above sampling or another sampling may be adopted in the present disclosure.

Figure 3:
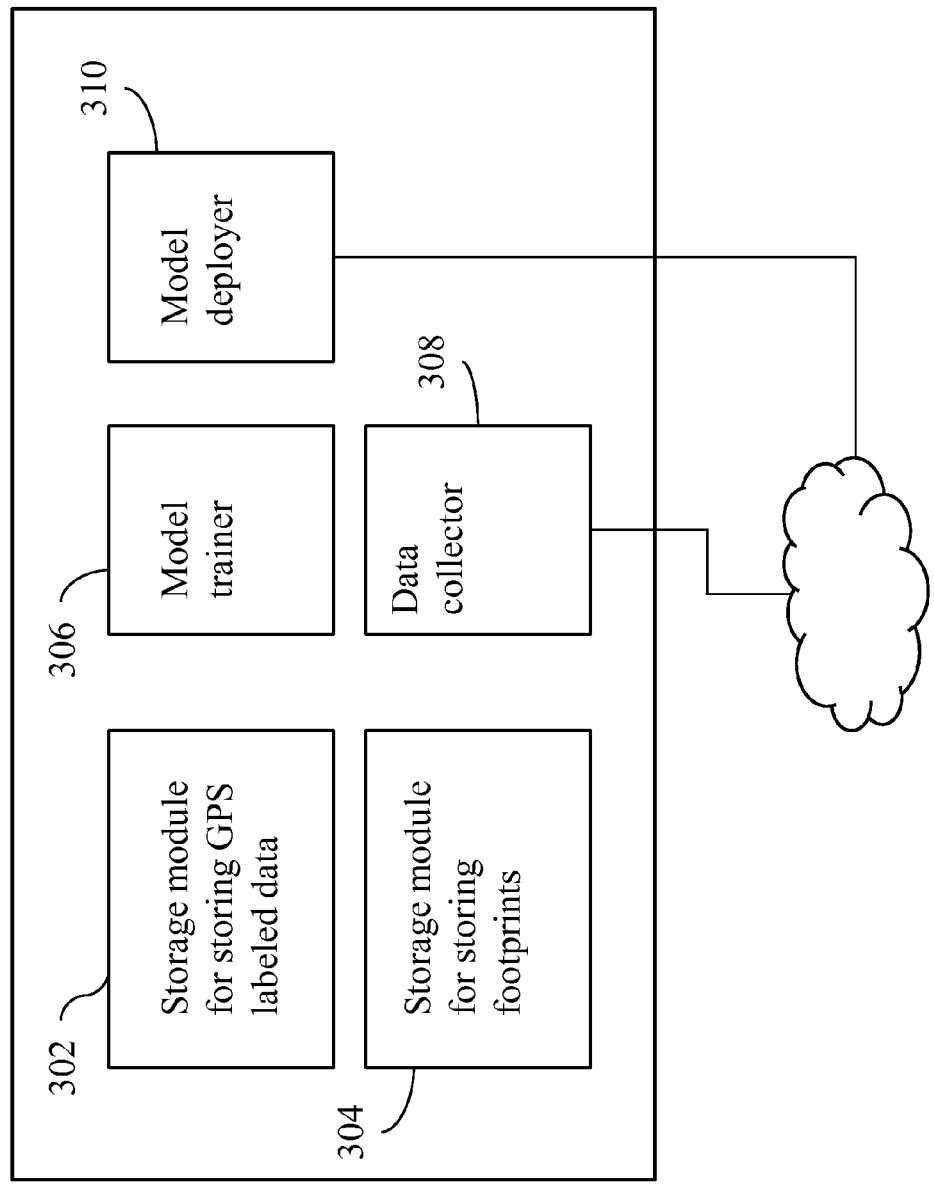
FIG. 3 is a diagram illustrating system components that dynamically model geospatial words in data in one embodiment of the present disclosure

FIG. 3 is a diagram illustrating system components that dynamically model geospatial words in data in one embodiment of the present disclosure. A storage device 302 or mechanism stores the GPS-labeled data generated since the last time the model has been refined. A storage device 304 or mechanism stores the footprints generated and chosen, for example, as described above with reference to FIG. 1 at 110 and 116. New footprints are stored at 304 as future refinement and iteration of the model. A model trainer 306 may be a computer executable that runs on one or more processors, e.g., with main memory, and trains the model (or generates the model by training it with data) for geotagging messages, for example, as described above with reference to FIG. 1 at 102 to 112. A data collector 308 collects data, e.g., text messages that include GPS or location data, e.g., via a communication network. The collected data is used to train the model, e.g., by the model trainer 306. A model deployer 310 may run the trained model to predict location information for new text message or data. The model trainer 306, data collector 308 and model deployer 310 may be computer executable objects that run on one or more processors. A network connection facilitates collection of the data and use of the model by external services, over the network, for example, via an application programming interface (API) for the model.

Figure 4:
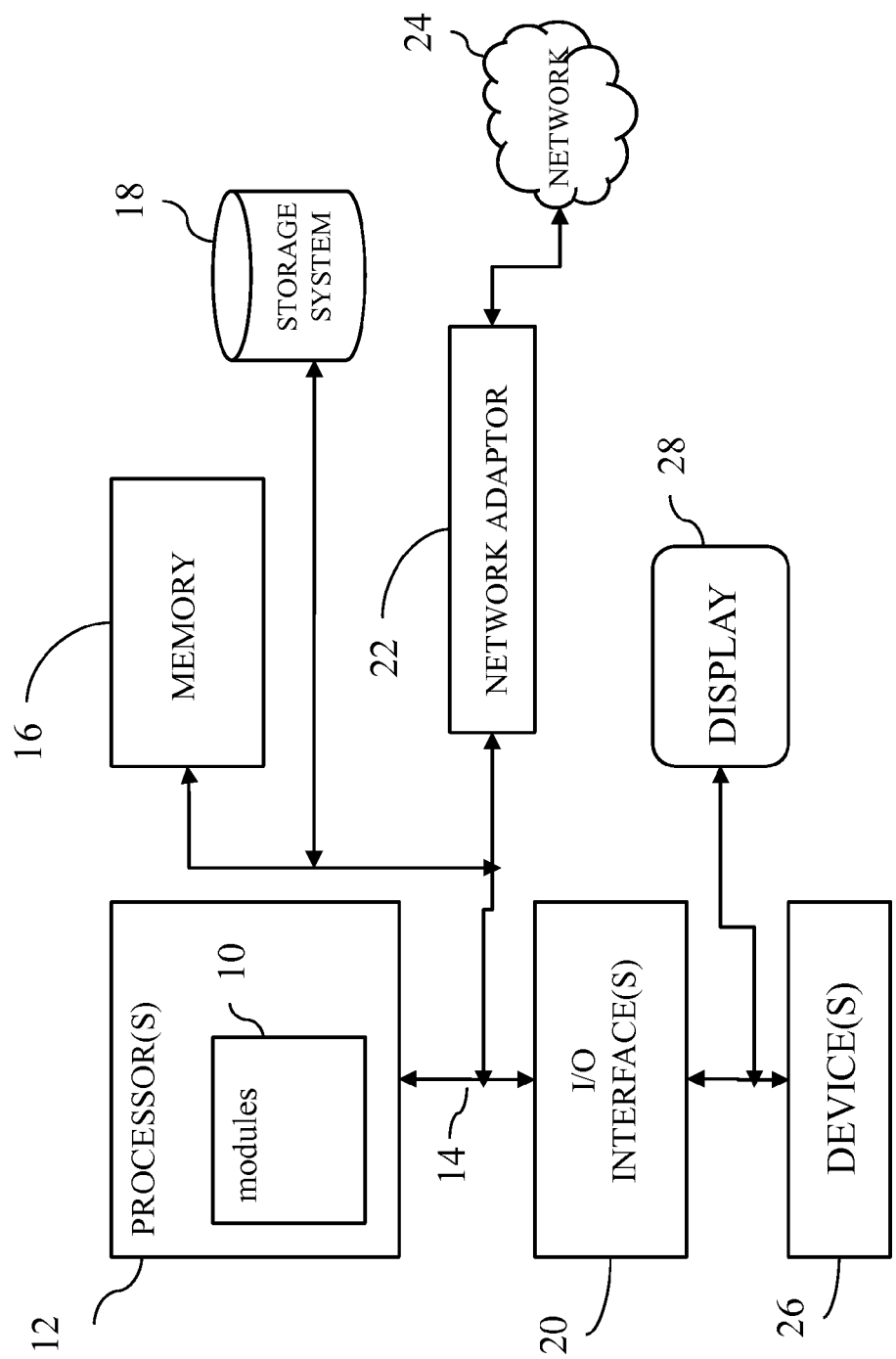
FIG. 4 illustrates a schematic of an example computer or processing system that may implement a dynamic modelling system in one embodiment of the present disclosure.

FIG. 4 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of dynamically modeling geospatial words in social media, comprising:
   receiving GPS annotated text data generated by a GPS-enabled device containing latitude and longitude coordinates;
   generating a word set based on frequencies of words occurring in the GPS annotated text data;
   partitioning locations by mapping GPS coordinates in the GPS annotated text data to a set of discrete non-overlapped locations;
   segmenting a text stream contained in the GPS annotated text data into time windows;
   generating footprints of locations in time windows;
   determining geospatial weights associated with words in the word set based on localness of words determined based on the footprints;
   dynamically integrating in geotagging by extracting words in a text message and determining scores associated with the set of discrete non-overlapped locations.

2. The method of claim 1, further comprising:
   sampling a fixed number of the time windows in the segmenting and the generating steps.

3. The method of claim 1, wherein the generating footprints of locations in time windows comprises, for each GPS annotated text data in a time window, constructing a bipartite graph between a word type of the GPS annotated text data and a mapped location.

4. The method of claim 3, wherein the generating footprints of locations further comprises determining an association strength between the word type and the mapped location.

5. The method of claim 4, further comprising selecting a predetermined number of locations based on the association strength as the footprints, the footprints parameterized by associated word type, time window, and the predetermined number.

6. The method of claim 1, further comprising predicting location information for a new text message based on words in the new text message and the geospatial weights.

* * * * *